(12) United States Patent
Hartmann et al.

(10) Patent No.: US 8,215,468 B2
(45) Date of Patent: Jul. 10, 2012

(54) LOCKING DEVICE FOR A START-STOP OPERATION OF A STARTER GENERATOR

(75) Inventors: Bernd Hartmann, Weisendorf (DE); Christian Hauck, Altdorf (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 545 days.

(21) Appl. No.: 12/372,993

(22) Filed: Feb. 18, 2009

(65) Prior Publication Data

US 2009/0211871 A1     Aug. 27, 2009

(30) Foreign Application Priority Data

Feb. 26, 2008   (DE) .......................... 10 2008 011 181

(51) Int. Cl.
| F16D 11/00 | (2006.01) |
| F16D 13/00 | (2006.01) |
| F16D 13/04 | (2006.01) |
| F16D 23/00 | (2006.01) |
| F16D 43/00 | (2006.01) |
| F16D 7/00 | (2006.01) |
| F16D 43/20 | (2006.01) |

(52) U.S. Cl. ................ 192/46; 192/104 C; 192/55.6

(58) Field of Classification Search ............. 192/41 S, 192/46, 55.6, 104 C, 48.6, 48.92, 103 B, 192/105 C, 70.14
See application file for complete search history.

(56) References Cited

U.S. PATENT DOCUMENTS

| 3,844,138 | A | * | 10/1974 | Samiran et al. ............... 464/40 |
| 4,494,637 | A | * | 1/1985 | Gotoda et al. ............... 192/48.4 |
| 4,673,073 | A | * | 6/1987 | Weatherby ................... 192/35 |
| 6,659,248 | B2 | * | 12/2003 | Terada .......................... 192/41 S |
| 6,848,552 | B2 | * | 2/2005 | Miller ............................ 192/45 |
| 7,143,881 | B2 | * | 12/2006 | Ichihara et al. ............... 192/45 |
| 7,347,309 | B2 | * | 3/2008 | Wiesneth et al. ............. 192/45 |
| 7,377,343 | B2 | * | 5/2008 | Adams et al. ............... 180/65.6 |
| 7,661,518 | B2 | * | 2/2010 | Kimes ........................... 192/46 |
| 7,708,661 | B2 | * | 5/2010 | Pflug et al. ................... 474/94 |
| 7,909,593 | B2 | * | 3/2011 | Ronk et al. ................... 418/171 |
| 2006/0096827 | A1 | * | 5/2006 | Lee ................................. 192/45 |
| 2009/0223775 | A1 | * | 9/2009 | Hodjat et al. ............... 192/41 S |

FOREIGN PATENT DOCUMENTS

| DE | 102006057793 | | 6/2008 |
| WO | WO 2007003052 | A1 * | 1/2007 |
| WO | 2007121582 | | 11/2007 |

* cited by examiner

*Primary Examiner* — David D Le
*Assistant Examiner* — Michael Gonzalez
(74) *Attorney, Agent, or Firm* — Volpe and Koenig, P.C.

(57) ABSTRACT

A torque-transmission system with a decoupler (1) between a shaft (2) and a belt pulley (3) of a starter generator is provided. The belt pulley can rotate relative to the shaft (2). For reducing rotary oscillations, the decoupler (1) includes a damping device arranged between the belt pulley (3) and the shaft (2) with at least one spring element (5). The decoupler (1) includes an automatic locking device (7) that is dependent on a direction of rotation and that produces, at a low rotational speed level, a coupling between the belt pulley (3) and the shaft (2), and this coupling automatically disconnects when a pre-determined rotational speed is reached.

2 Claims, 3 Drawing Sheets

LOCKING DEVICE FOR A START-STOP OPERATION OF A STARTER GENERATOR

CROSS-REFERENCE TO RELATED APPLICATIONS

This application claims the benefit of German Application DE 10 2008 011 181.3, filed Feb. 26, 2008, which is incorporated herein by reference as if fully set forth.

BACKGROUND

The invention relates to a decoupler that represents a device formed as a torque-transmission system between a shaft and a belt pulley of a starter generator, wherein the belt pulley can rotate relative to the shaft. For reducing rotary oscillations between the belt pulley and the shaft, the decoupler comprises a damping device including at least one spring element.

For internal combustion engines used in motor vehicles, two separate assemblies are conventionally used for generating power and for starting the internal combustion engine, a starter motor (also called a cranking motor) and a generator. The starter motor is used exclusively for starting the internal combustion engine and the generator is used for operating all of the electrical loads in the internal combustion engine and the motor vehicle.

In belt-driven starter generators (RSG systems), in the start cycle, the generator belt pulley transmits the torque for starting the internal combustion engine. Immediately after a successful start of the internal combustion engine, the starter generator is driven by the internal combustion engine, wherein, independent of the operating cycle of the starter generator, the direction of rotation of the traction mechanism drive is unchanged. Due to the rotational irregularity of the internal combustion engine, the starter generator requires a so-called generator decoupling device that is realized by a decoupler that can start and stop and that has rigid end stops by which, in the start cycle, the starting moment can be introduced into the belt drive. It has proven to be problematic that at the beginning of the start process or while running through the natural resonance rotational speed of the decoupler, the rotation of the generator shaft relative to the generator belt pulley is very large and thus the end stop is reached, whereby a pulse is introduced into the belt drive. This pulse generates disadvantageous force spikes that are transmitted to assemblies arranged adjacent to the starter generator.

It is known to equip motor vehicles with a so-called start-stop function in which the internal combustion engine is automatically turned off after a fixed time interval in the idling cycle and is automatically started after the gas pedal is actuated. For this function, a starter generator according to WO 2007/121582 A1 is suitable.

From DE 10 2006 057 793 A1 a belt-driven starter generator is known to which a free-running belt pulley that is also designated as a decoupler belt pulley is allocated. This belt pulley can rotate relative to a shaft of the assembly via a bearing. For transmitting the rotational movement of the belt drive from the belt pulley to the shaft and in order to simultaneously equalize the rotational irregularity introduced into the belt drive in the internal combustion engine, a spring element is inserted between the belt pulley and the shaft. Accordingly, in this way, the effective torsional rigidity of the spring element allows relative rotation between the belt pulley and the shaft.

SUMMARY

The object of the invention is to provide a decoupler that has a locking device that acts at least partially automatically for an operating range.

This object is met according to the invention by a decoupler, also designated as a decoupling device, which includes an automatic locking device that acts dependent on centrifugal force. At a low rotational speed level of the starter generator, this allows at least a partial coupling between the belt pulley and the shaft, wherein this coupling automatically disconnects when a defined rotational speed is reached. Advantageously, the decoupler according to the invention is built so that this locks the generator belt pulley in the start cycle partially or depending on the rotational direction. Through the design according to the invention, especially for a belt-driven starter generator, but also for a conventional pinion start of the internal combustion engine, a decoupler can be realized that is ideally blocked in the start direction (generator start), whereby the force spikes in the start phase are reduced significantly. Based on the rotational direction-dependent locking device according to the invention, the decoupler can maintain its original characteristic line in the opposite direction. Preferably, the centrifugal force-controlled locking device is disconnected only after the belt drive has reached a defined rotational speed, for example, a start rotational speed of the internal combustion engine. When this rotational speed range is reached, the decoupler has already run through its natural resonance. The invention prevents the introduction of relatively large start moments into the shaft of the decoupler during the generator start and prevents rotation by half the operating range of the decoupler in the load direction up to an end stop. Due to the relatively long acceleration path of the shaft of ca. 40 angular degrees, without the measures according to the invention, the shaft stops could impact with large momentum onto the still stationary end stops. The invention thus prevents large force spikes that are introduced into the belt drive and that have disadvantageous effects on components or assemblies arranged in coordination with or subordinate to the starter generator with associated decouplers.

Additional advantageous configurations of the invention are described below.

Preferably, a locking device is provided that is dependent on centrifugal force and that comprises at least one end stop or catch positioned in the load direction of the decoupler, wherein this end stop or catch interacts with a radially positioned pin. For this purpose, it is provided to arrange the spring-loaded pin in a radial guide of the belt pulley that is supported for locking in a recess of the shaft on an end stop. This setup creates a locking of the decoupler in the start phase in the rotational direction of the internal combustion engine. Advantageously, the locking device has two diametrically opposed, radially directed pins that are integrated into the belt pulley and that each engage in a recess of the shaft for coupling with the shaft dependent on the rotational speed or disconnect the locking device when a shifting rotational speed is reached. As the preferred recess, there is a length-limited groove that is formed in the outwardly directed surface of the shaft and that forms a continuously deepening, rounded profile starting from a shaft diameter up to the end stops.

One preferred configuration according to the invention provides that coupling is realized through the locking of the belt pulley with the shaft in the start phase of the internal combustion engine in a middle position. Alternatively, the invention includes a locking device by which, in the start phase, a coupling is realized between the shaft and the belt pulley in a position offset relative to the middle position.

As the spring element or spring accumulator, the decoupler comprises at least one bow spring formed as a coil spring that is inserted between the belt pulley and the shaft. For this purpose, correspondingly shaped recesses in which the bow spring is held with a positive fit are provided in the belt pulley and in the shaft.

DETAILED DESCRIPTION OF THE PREFERRED EMBODIMENTS

Figure 1:
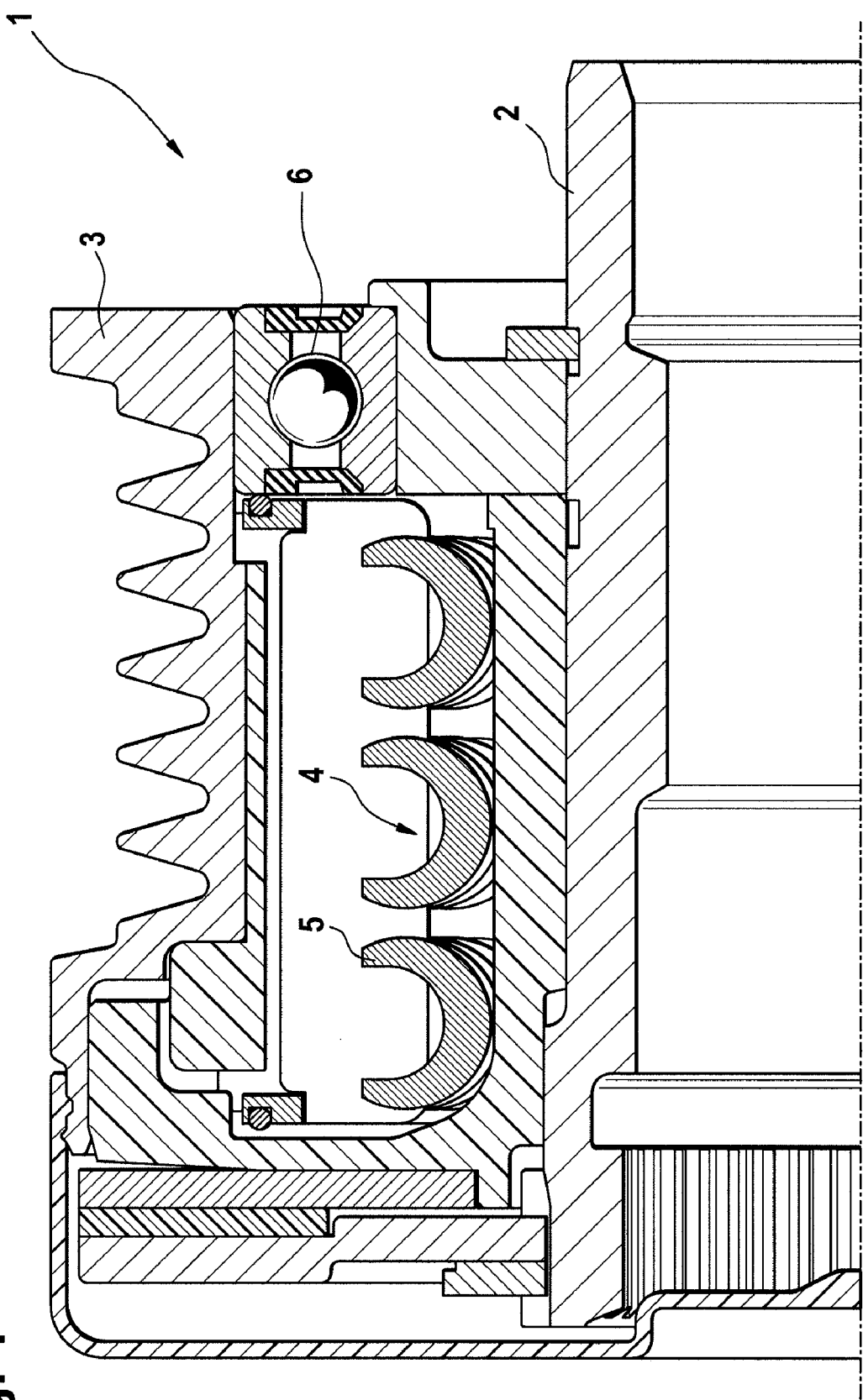
FIG. 1 is a longitudinal section view of an upper half of a decoupler.
Figure 2:
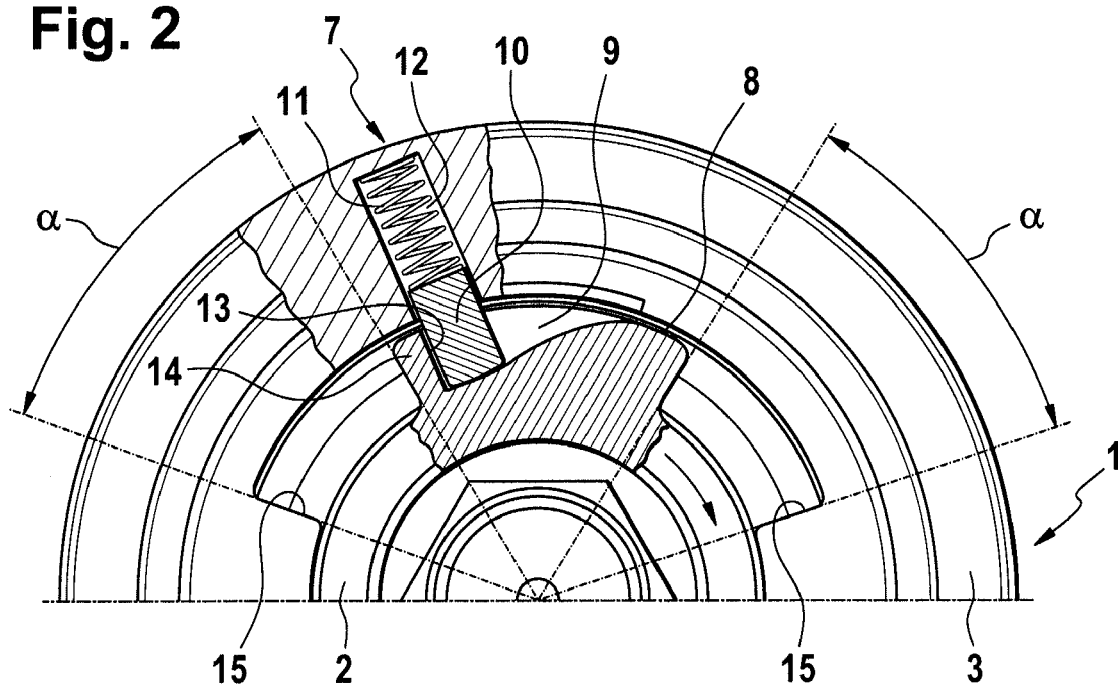
FIG. 2 is a view of one half of the decoupler with the engaged locking device according to the invention.
Figure 3:
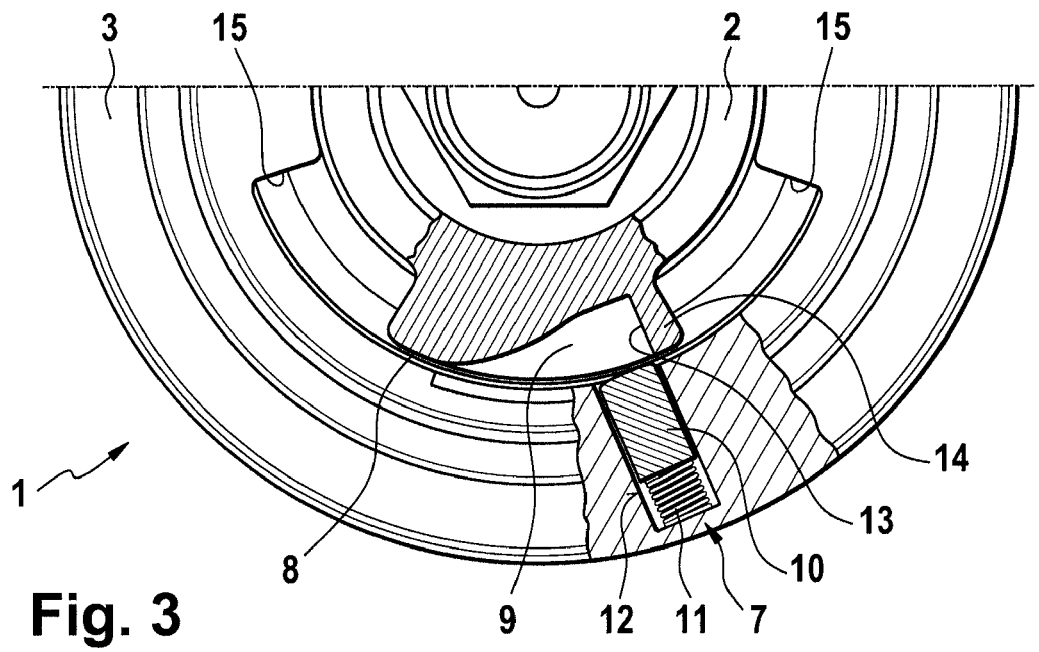
FIG. 3 is a view of one half of the decoupler with the disengaged locking device according to the invention.

FIG. 1 shows the setup of a known decoupler 1 that is allocated, for example, to a belt-driven starter generator of an internal combustion engine (not shown in FIG. 1). The following description is supported, in particular, on the components between which the locking device shown in FIGS. 2 and 3 is arranged. One shaft 2 is locked in rotation with the auxiliary assembly, in particular, a starter generator, to be decoupled depending on oscillation. The task of the decoupler 1 is to damp torsional oscillations between the shaft 2 and a belt pulley 3 enclosing the shaft 2 concentrically. For this purpose, a damping device 4 is provided consisting of three bow springs arranged parallel to each other and forming a spring element 5 or a spring accumulator. For this purpose, the individual bow springs are supported by spring ends indirectly on the shaft 2 or the belt pulley 3. A roller bearing 6 arranged between the belt pulley 3 and the shaft 2 allows a relative movement between these components.

FIG. 2 shows one half of the decoupler 1 with an integrated locking device 7 that allows a rotational direction-dependent coupling or locking between the shaft 2 and the belt pulley 3. For this purpose, a recess 9 shaped as a groove is formed in a lateral surface 8 or top surface of the shaft 2. In this recess, a pin 10 allocated to the belt pulley 3 is fitted with a positive fit and supported on an end stop 13. This position is assumed by the pin 10 positioned radially in a blind borehole 12 of the belt pulley 3 through loading by a compression spring 11. When the internal combustion engine is started by a belt-driven starter generator, a torque in the arrow direction or in the clockwise direction is applied to the shaft 2, wherein this torque is transmitted directly onto the belt pulley 3 via the engaged locking device 7. For an opposite torque direction there is the possibility of relative rotation between the shaft 2 opposite the belt pulley 3 that corresponds to a half operating range, indicated as angle "a", of the decoupler 1. This operating range is limited as soon as a cam 14 of the shaft 2 contacts an end stop 15 of the belt pulley 3. The locking device 7 is thus positioned in a middle position between the maximum operating range that corresponds to twice the angle "a".

FIG. 3 shows the disconnected locking device 7 of the decoupler 1 in a position set after the start of the internal combustion engine. When a starting rotational speed of the internal combustion engine is exceeded, the pin 10 is pressed outward in the radial direction due to centrifugal force, whereby it no longer overlaps the end stop 13. In this rotational speed range or in this position of the locking device 7, the decoupler (1) can perform its complete operating range of ± the angle "α".

Figure 4:
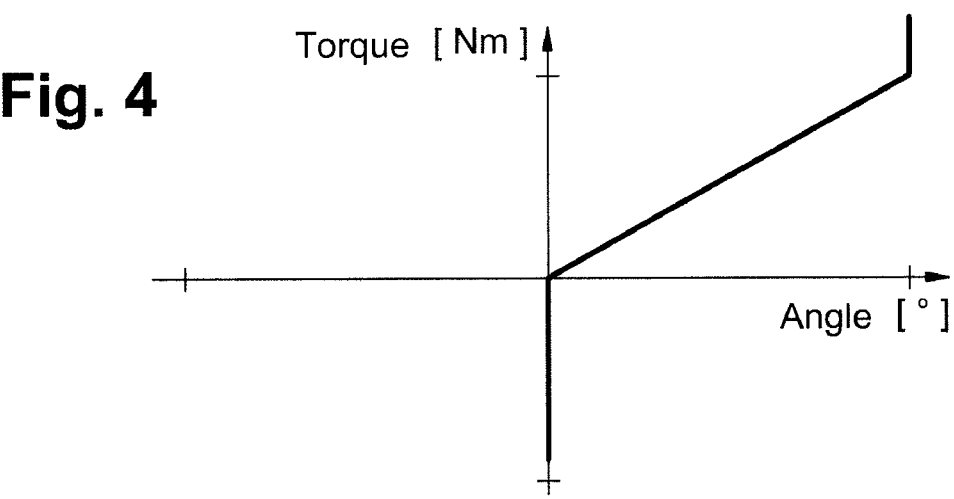
FIG. 4 is a graph of a torsional-rigidity characteristic line in the locked state of the decoupler.
Figure 5:
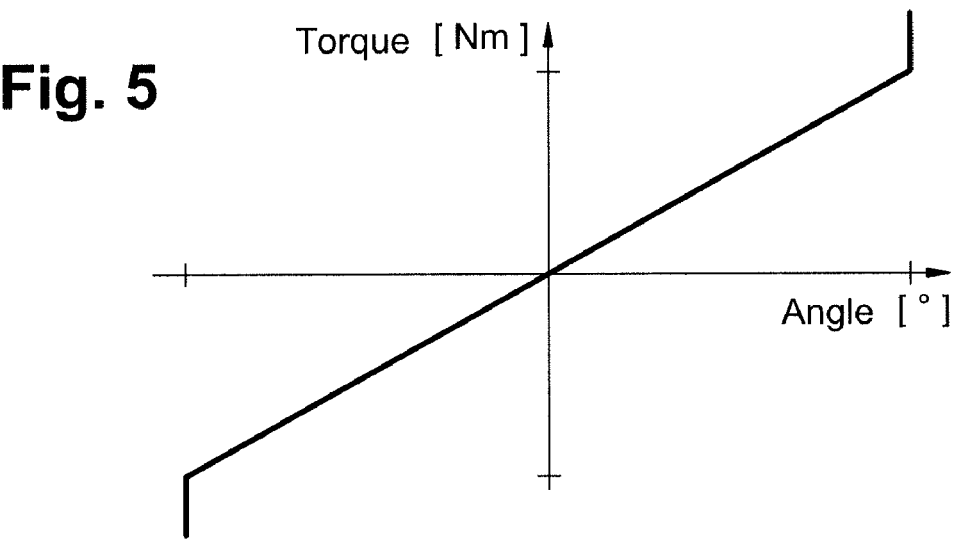
FIG. 5 is a graph of a torsional-rigidity characteristic line in the unlocked state of the decoupler.

FIGS. 4 and 5 show torsional-rigidity characteristic lines for the decoupler 1 whose locking device 7 is arranged in a middle position of the operating range, in the locked state (FIG. 4), and in the unlocked state (FIG. 5), respectively.

Figure 6:
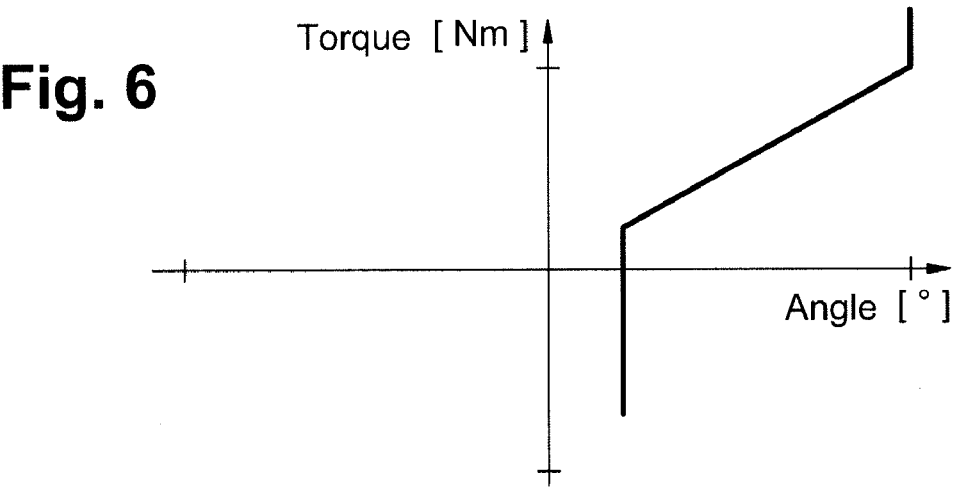
FIG. 6 is a graph of a torsional-rigidity characteristic line that corresponds to a locking device offset from a middle position.

FIG. 6 shows another torsional-rigidity characteristic line for the decoupler 1 whose locking device 7 is arranged offset relative to the middle position of the operating range.

LIST OF REFERENCE SYMBOLS

1 Decoupler
2 Shaft
3 Belt pulley
4 Damping device
5 Spring element
6 Roller bearing
7 Locking device
8 Lateral surface
9 Recess
10 Pin
11 Compression spring
12 Blind borehole
13 End stop
14 Cam
15 End stop

The invention claimed is:

1. A decoupler for a torque-transmission system between a shaft and a belt pulley of a starter generator in which belt pulley can rotate relative to the shaft, the decoupler comprising at least one spring element for reducing rotary oscillations as a damping device between the belt pulley and the shaft, and a rotational direction-dependent, automatic locking device that in a first rotational direction creates a coupling between the belt pulley and the shaft at a low rotational speed level, and automatically disconnects the coupling when a predetermined rotational speed is reached, and for a second, opposite rotational direction, the locking device allows a relative rotation between the pulley and the shaft, wherein the locking device engages in a middle position of an operating range between the belt pulley and the shaft.

2. A decoupler for a torque-transmission system between a shaft and a belt pulley of a starter generator in which belt pulley can rotate relative to the shaft, the decoupler comprising at least one spring element for reducing rotary oscillations as a damping device between the belt pulley and the shaft, and a rotational direction-dependent, automatic locking device that in a first rotational direction creates a coupling between the belt pulley and the shaft at a low rotational speed level, and automatically disconnects the coupling when a predetermined rotational speed is reached, and for a second, opposite rotational direction, the locking device allows a relative rotation between the pulley and the shaft, wherein the locking device engages offset to a middle position of an operating range between the belt pulley and the shaft.

* * * * *